United States Patent [19]
Rakcevic

[11] 3,806,734
[45] Apr. 23, 1974

[54] SYSTEM FOR MONITORING BREAK-AWAY DEVICES OF TURBINE VANES

[75] Inventor: Savo Rakcevic, Ljubljana, Yugoslavia

[73] Assignee: Titovi Zavodi Litostroj, Ljubljana, Yugoslavia

[22] Filed: Oct. 4, 1972

[21] Appl. No.: 294,788

[52] U.S. Cl. ............................. 307/118, 340/240
[51] Int. Cl. ................................. H01h 35/18
[58] Field of Search ............... 307/118, 116, 119; 340/240

[56] References Cited
UNITED STATES PATENTS 3,593,266   7/1971   Van Sickle .................. 340/240 X
3,594,745   7/1971   Nickels ........................ 340/240 X Primary Examiner—Herman J. Hohauser
Attorney, Agent, or Firm—Karl F. Ross; Herbert Dubno

[57] ABSTRACT

A system for monitoring the break-away devices provided on the guide vanes of a hydraulic turbine comprises shear-bolts which are tubular and are connected to a common source of fluid pressure, the pressure system being provided with a pressure switch which is operated upon rupture of any of the elements to signal this fact to the operator of the system.

3 Claims, 2 Drawing Figures

SYSTEM FOR MONITORING BREAK-AWAY DEVICES OF TURBINE VANES

This invention relates to a device for signaling the rupture of safety elements on the guide wheel of a hydraulic turbine. For signalizing of rupture of any number of safety elements an electric switch is preferably used.

The wheel of a hydraulic turbine, comprising a larger number of vanes, may be provided with a safety element on each moving mechanism for rotating a vane. The safety element is arranged and designed such that it is ruptured when the maximum permissible stress is reached at the moving parts of the turbine wheel. Such stress occurs mostly while closing the guide wheel when rigid objects are carried between the vanes with the driving water. By rupture of the safety element the stresses one the moving parts of that mechanism are reduced, thereby preventing excessive stress. The remaining parts of the guide wheel where no excessive stresses have occurred and the safety element has not been ruptured can be further controlled or closed. The guide vane having a ruptured safety element in its mechanism is isolated from the remainder of the guide wheel and therefore does not follow the rotation of other guide vanes, thereby creating unfavorable influences on the turbine such as: reduced operation safety, vibration, cavitation, inaccuracy of control and reduced turbine efficiency. These disadvantages increase with the growing number of ruptured safety elements and with the length of time during which the turbine operates with ruptured safety elements. This is the reason why an immediate signaling of the rupture of safety elements and resumption of normal operation are necessary.

In practice hitherto the rupture of the safety elements has mostly been detected by the operating personnel of the turbine only at periodic overhauls. In this case it can easily occur that the turbine is operated in an unfavorable operating condition, i.e. with ruptured safety elements for a long time. Electric signaling is also used; for each safety element a special electric switch is provided which is operated directly or through a special mechanism if the safety element is ruptured. This signaling technique is expensive, because of the large number of switches needed, the difficult of incorporating the special protection required by the operation into the system, and the high humidity of the place in which the switches and cables have to be installed.

The signaling of such break-away rupture of safety elements is realized also by mechanical connection of all of the safety elements by steel ropes and corresponding pulleys and by signaling with a single electric switch. This kind of signaling system is not easy to arrange and is not reliable enough for most purposes and thus is only rarely used.

The signaling of such rupture of safety elements according to the present invention uses a single electric switch independent of the location or disposition of the safety elements.

The device for signaling rupture of such safety elements in FIGS. 1 and 2.

Figure 1:
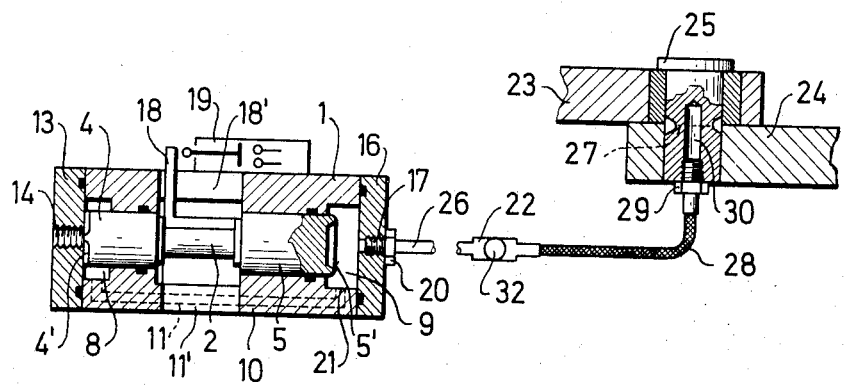
FIG. 1 is a cross-section of the device for signaling rupture of safety elements on the guide wheel of a hydraulic turbine.

The device, on the guide wheel 39 of a hydraulic turbine, comprises; a pressure valve 1 with an electric switch 19. The pressure valve 1 is through a connection 20, a tube 26, distributors 22, connecting tubes 32 and flexible tubes 28 by connections 29 connected to all safety elements 25. In this case safety elements 25 are connections between cranks 24 which by keys 35 are bound to guide vanes 34 and connections 23 which by pins 36 are movably attached to the control ring 38.

Figure 2:
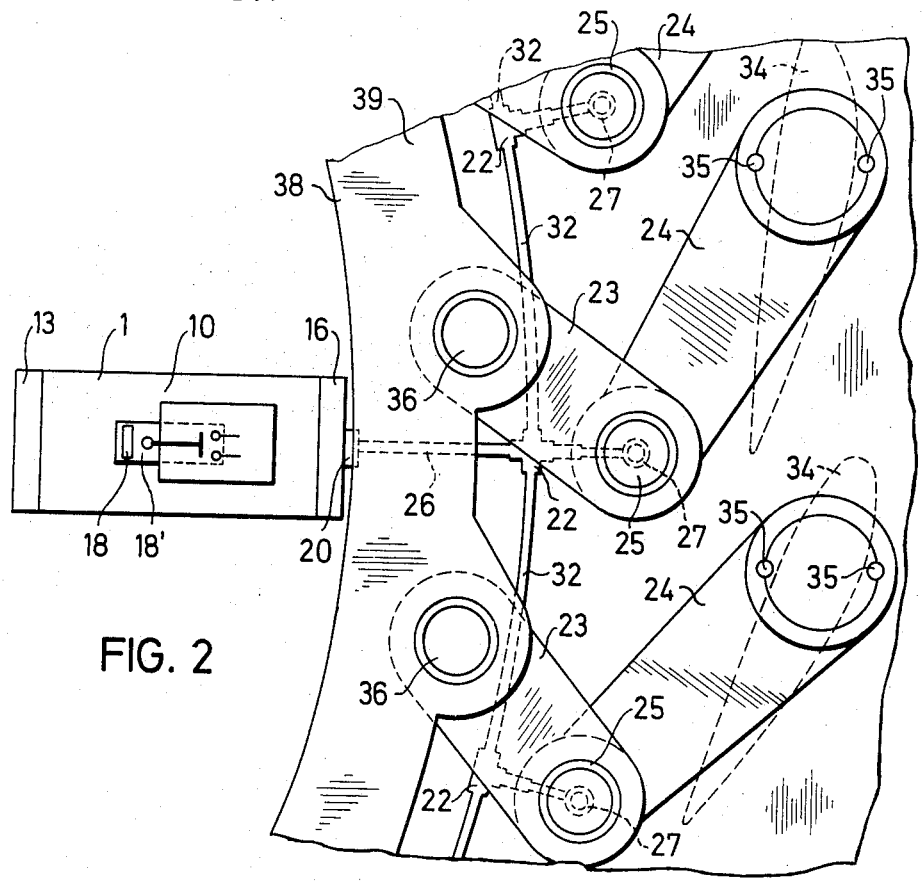
FIG. 2 shows the same device in connection with other elements of the guide wheel of a hydraulic turbine.

The pressure valve 1 comprises a casing 10 in which the piston 2 can move. The case 10 has an elongated cutout 18' in which an angle bracket 18 is movable, the bracket is fastened to the piston 2 between its left part 4 and right part 5. The angle bracket 18 is arranged so that, upon a movement of piston 2, it activates the electric signaling switch 19. The front surface 4' of part 4 of the piston 2 is smaller than the front surface 5' of part 5 of piston 2. The front surface 4' of part 4 of the piston 2 bears against the cover 13 so that almost the entire front surface 4' is exposed to pressure. Part 5 of the piston 2 with its front surface 5' stops the flow of the medium from compartment 9 through a bore 17 and a connection 20 in the cover 16. In the casing 10 a channel 11 connects the compartments 8 and 9. This channel 11 comprises a throttle 21 having a greater resistance against the flow of the medium than the total flow resistance from the throttle up to and including the outflow of the medium through aperture 30 of the safety element 25 when only one safety element 25 is ruptured. The casing 10 contains an elongated opening 11' through which the piston 2 can be moved with the aid of a convenient mechanical means not shown in FIGS. 1 and 2. The pressure medium (water, oil, air etc.) which is usually available is supplied through an opening 14 of the cover 13 into the compartment 8 and through channel 11, throttle 21 into the comparment 9 and therefrom through bore 17, connection 20, tube 26, distributors 22, tubes 32, flexible tubes 28, connections 29 into apertures 30 reaching over the rupturing surface 27 of the safety elements 25.

In case of the rupture of one or several safety elements 25 at the rupturing surface 27, a free outflow is given to the pressure medium through aperture 30. Since the flow resistance of the pressure medium from throttle 21 up to the free outflow through aperture 30 — when the safety element is ruptured at the rupturing surface 27 — is smaller than the flow resistance of the medium up to and including the throttle 21, the pressure of the medium in compartment 9 is reduced. The pressure force on the front surface 4' then is greater than the pressure force on the front surface 5' and thus piston 2 is moved to the cover 16, interrupting, by its front surface 5', the flow of the pressure medium from compartment 9 through bore 17 and aperture 30 in the safety element 25. Simultaneously with the movement of piston 2 the electric switch (19) has been switched on, signaling the rupture of safety elements 25 through corresponding installation.

After the rupture of any number of safety elements 25 has been signaled, it is necessary to replace the ruptured safety elements 25 by new ones. Then the flexible tube 28 with the connection 29 must be connected to the new safety element 25. When this has been accomplished the piston 2 has to be moved away from cover 16 with an appropriate mechanical means through opening 11' in order to balance the pressure forces acting upon front surfaces 4' and 5'.

Since front surface 5' is larger than front surface 4', after the pressures in compartments 8 and 9 become equal, piston 2 moves by itself into the position which it has occupied before the rupture of the safety element 25. Thereby the device is prepared for subsequent signaling.

What we claim is:

1. In a guide wheel of a hydraulic turbine having a plurality of pivotal guide vanes, the improvement which comprises a respective hollow break-away member connected to each vane and rupturable upon excessive stressing thereof to vent the interior of said member; a piston-and-cylinder arrangement including a casing and a piston shiftable in said casing and subdividing same into two compartments chargeable with fluid under pressure to exert oppositely directed forces on said piston; conduit means communicating between the interiors of said members and none of said compartments; means for supplying fluid under pressure to the other of said compartments whereby said piston is biased in one direction until fluid is vented from said one of said compartments whereby said piston moves in the opposite direction under fluid pressure differential between said compartment; and an electrical signaling switch actuatable by said piston upon the movement thereof in said opposite direction.

2. The improvement defined in claim 1 wherein said conduit means communicates with said one of said compartments at a passage formed in said casing, said piston being formed with an annular portion engageable with said casing around said passage upon movement of the piston in said opposite direction to seal said conduit means from said one of said compartment.

3. The improvement defined in claim 1 wherein said casing is formed with an elongated cutout and said piston is provided with a lateral projection extending through said cutout and engaging said switch.

* * * * *